(12) United States Patent
Deuskar et al.

(10) Patent No.: US 11,983,758 B2
(45) Date of Patent: May 14, 2024

(54) SYSTEMS AND METHODS FOR OUTFIT CUSTOMIZATION VIA A DYNAMIC AND INTERACTIVE USER INTERFACE

(71) Applicant: Stylitics, Inc., New York, NY (US)

(72) Inventors: Rohan Deuskar, New York, NY (US); Jeremy Raines, Hayward, CA (US); May Do, Belleville, NJ (US); Milusa Cickova, New York, NY (US)

(73) Assignee: Stylitics, Inc., New York, NY (US)

( * ) Notice: Subject to any disclaimer, the term of this patent is extended or adjusted under 35 U.S.C. 154(b) by 0 days.

(21) Appl. No.: 17/857,275

(22) Filed: Jul. 5, 2022

(65) Prior Publication Data

US 2022/0335502 A1    Oct. 20, 2022

Related U.S. Application Data

(63) Continuation of application No. 16/877,837, filed on May 19, 2020, now Pat. No. 11,379,902.

(51) Int. Cl.
*G06Q 30/00* (2023.01)
*G06Q 30/0601* (2023.01)

(52) U.S. Cl.
CPC ..... *G06Q 30/0631* (2013.01); *G06Q 30/0643* (2013.01)

(58) Field of Classification Search
CPC ... G06Q 30/0623–0631; G06Q 30/0641–0643
See application file for complete search history.

(56) References Cited

U.S. PATENT DOCUMENTS

| | | |
|---|---|---|
| 9,965,801 B1 | 5/2018 | Wishne et al. |
| 10,475,099 B1 | 11/2019 | Nomula et al. |
| 2010/0094729 A1 | 4/2010 | Gray et al. |
| 2011/0093361 A1 | 4/2011 | Morales |

(Continued)

OTHER PUBLICATIONS

McAuley, Julian, et al. "Image-based recommendations on styles and substitutes." Proceedings of the 38th international ACM SIGIR conference on research and development in information retrieval. 2015. (Year: 2015).*

(Continued)

*Primary Examiner* — Michael Misiaszek
*Assistant Examiner* — Kennedy Gibson-Wynn
(74) *Attorney, Agent, or Firm* — Ansari Katiraei LLP; Arman Katiraei; Sadiq Ansari

(57) ABSTRACT

A style-driven system may create a holistic shopping experience by generating a user interface ("UI") with interactive controls and a single presentation for an outfit with two or more items selected from two or more different categories of goods having different utilities or purposes. The single presentation may provide a comprehensive and holistic presentation of the outfit by presenting the items together with a particular arrangement. The holistic shopping experience may include selecting a set of substitute items that are in a same category of goods as a particular item of the outfit and that have one or more style attributes in common with the particular item, and modifying the UI by presenting the set of substitute items for the particular item, and by replacing the particular item in the particular arrangement with a selected substitute item from the set of substitute items.

17 Claims, 10 Drawing Sheets

(56) References Cited

U.S. PATENT DOCUMENTS

| | | | |
|---|---|---|---|
| 2014/0180864 A1* | 6/2014 | Orlov | G06Q 30/0631 |
| | | | 705/26.7 |
| 2014/0379426 A1 | 12/2014 | Guo et al. | |
| 2017/0011452 A1* | 1/2017 | Beckham | G06Q 30/0643 |
| 2017/0039628 A1* | 2/2017 | Wang | G06Q 30/0621 |
| 2017/0076011 A1 | 3/2017 | Gannon | |
| 2017/0262959 A1* | 9/2017 | Lee | G06T 7/32 |
| 2018/0137515 A1 | 5/2018 | Higgins et al. | |
| 2019/0264361 A1* | 8/2019 | Oden | G06Q 10/06315 |
| 2019/0266664 A1 | 8/2019 | Beckham | |
| 2020/0364767 A1 | 11/2020 | Bacharach et al. | |
| 2020/0375293 A1 | 12/2020 | Koh | |

OTHER PUBLICATIONS

Hsiao, Wei-Lin, and Kristen Grauman. "Creating capsule wardrobes from fashion images." Proceedings of the IEEE conference on computer vision and pattern recognition. 2018. (Year: 2018).*

Vartak, Manasi, and Samuel Madden. "CHIC: a combination-based recommendation system." Proceedings of the 2013 ACM SIGMOD International Conference on Management of Data. 2013. (Year: 2013).*

Pavan Bahl, Rob Sanchez, Marc Raco, and Rohan Deuskar, "204—Rohan Deuskar of Stylitics—The Styling Army's Gone, The Quality Remains", Nov. 1, 2017, online audio available at http://f0a6712338bce50fa875-a63e7bb235489df2f5cc73d25074ae05.r77.cf5.rackcdn.com/fiyb_ep_204_stylitics_nab.mp3 [transcript provided].

Stylitics website, "Mix and Match", Aug. 26, 2018, https://web.archive.org/web/20180826114522/http://stylitics.com/products/e-commerce/.

* cited by examiner

FIG. 8

SYSTEMS AND METHODS FOR OUTFIT CUSTOMIZATION VIA A DYNAMIC AND INTERACTIVE USER INTERFACE

CLAIM OF BENEFIT TO RELATED APPLICATIONS

This application is a continuation of U.S. nonprovisional application Ser. No. 16/877,837 entitled "Systems and Methods for Outfit Customization via a Dynamic and Interactive User Interface", filed May 19, 2020. The contents of application Ser. No. 16/877,837 are hereby incorporated by reference.

BACKGROUND

Online shopping and eCommerce may be based on user queries. A user may submit a query for an item having certain attributes or a certain description. The site may return items that are most relevant to the query. The user may then select the item that best matches the user criteria before submitting a query for a next item. In this shopping model, items are selected in isolation or independent of one another.

Fashion and clothing purchases often do not occur in isolation or independent of the other items that are selected for purchase. A user may select an article of clothing by considering other articles of clothing and/or clothing accessories that the user has purchased or is looking to purchase. Accordingly, a holistic shopping model for fashion and clothing is preferred so that the selected articles of clothing and clothing accessories have a common style and/or achieve a collective look. However, the query-based approach for viewing and selecting items in isolation prevents such a holistic shopping model.

BRIEF DESCRIPTION OF THE DRAWINGS

FIG. 8 presents an example set of metadata and/or tags that may be generated for different items in accordance with some embodiments presented herein.

DETAILED DESCRIPTION OF PREFERRED EMBODIMENTS

Figure 1:
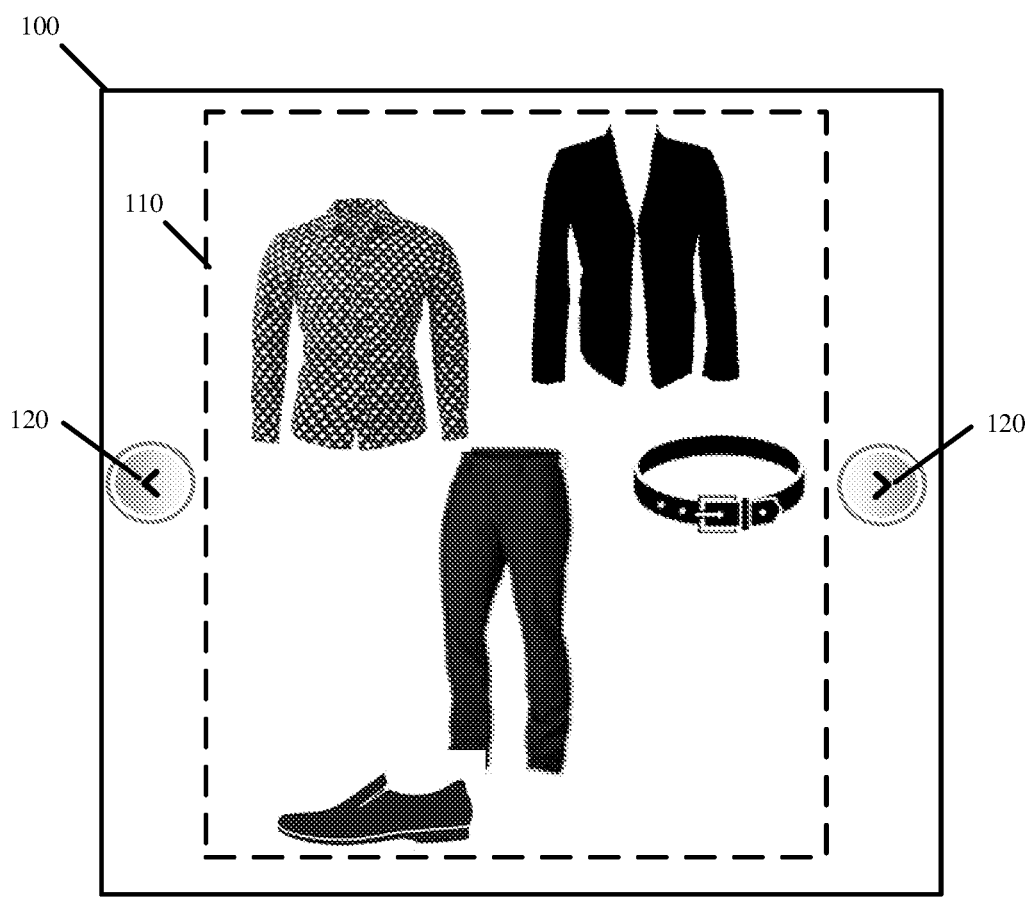
FIG. 1 illustrates an example user interface ("UI") for presenting two or more items from different categories of goods with distinct utility or distinct purposes in a single presentation to create a grouping with a particular style in accordance with some embodiments presented herein.

The following detailed description refers to the accompanying drawings. The same reference numbers in different drawings may identify the same or similar elements.

Disclosed are systems and methods for generating a holistic shopping experience. Generating the holistic shopping experience may include presenting two or more items from two or more different categories of goods having different utilities or purposes within a single presentation. Generating the holistic shopping experience may further include providing interactive controls for replacing any of the two or more items within the single presentation, and dynamically updating the single presentation to visually present the collective styling of the customized collection of items that results after one or more replacements.

In some embodiments, a style-driven system may generate at least one grouping of two or more items from the two or more different categories based on complementary or matching attributes that identify a similar style for the two or more items. The style-driven system may provide the at least one grouping and the interactive controls in a user interface ("UI"). The interactive controls may accept input to select any particular item in the grouping, and to modify the grouping by replacing the particular item with another item that is in the same category of goods as the particular item and/or that conforms to the style of the particular item or all items in the grouping. Once a substitute item is selected for the particular item, the UI may dynamically update to display the collective styling of the substitute item from a first category of goods with the other items of the grouping from different categories of goods.

In preferred embodiments, the grouping may correspond to an ensemble comprising different articles of clothing and clothing accessories, wherein each article of clothing or clothing accessory may be chosen from a different category of goods, and each category of goods may have a distinct utility or a distinct purpose. For instance, the ensemble may be an outfit that includes some combination of a hat, clothing top, clothing bottom, outerwear, underwear, socks, shoes, belts, purses, earrings, necklaces, and/or articles of clothing or fashion accessories from other categories of goods. Moreover, the articles of clothing or clothing accessories that the style-driven system includes or offers as a substitute for a grouping may be filtered to conform to a common style of the grouping or a selected item from the grouping. In doing so, the style-drive system may prevent arbitrary or mismatched articles of clothing and clothing accessories from being provided as substitutes, and may prevent articles of clothing and clothing accessories that match only in terms of being in the same category irrespective of style or that only match specified keywords irrespective of style from being provided as substitutes. Instead, the style-driven system may dynamically curate a style based on commonality in the look, pattern, color, material, cut, fit, brand, and/or other visual characteristics of the articles of clothing and clothing accessories that are in the grouping or can be substitutes for the grouping.

In some embodiments, the grouping may correspond to other goods in categories other than clothing and clothing accessories that can be grouped based on a common style. For example, the style-driven system can create a grouping for different home furnishings, furniture, and/or décor that have a common style, and can provide substitutes for any of the goods that conform to the common style of the grouping or a good that is selected for replacement. In this example, the style-driven system may generate a grouping that includes a rug, table, chair, and coffee table that have a complementary look, pattern, color, material, and/or other style attributes, and may present a particular arrangement of the grouping in a single presentation so that the common style formed by the goods in the grouping can be visualized together. A user may then interact with any of the goods in the groupings to view substitute goods that conform to the style, and the style-driven system may dynamically update the single presentation with a selected substitute good so that the stylistic fit of the selected substitute good with the other goods of the grouping can be visualized together and/or purchased together.

In some embodiments, the grouping may correspond to consumable goods. In some such embodiments, the style may be determined according to the flavor profile of different foods and drinks. For example, a grouping that conforms to a common style may include sweet and sour food and drink items. As another example, a grouping that conforms to a common style may include an appetizer, entrée, and dessert that fit a seafood style.

FIG. 1 illustrates example UI 100 for presenting two or more items from different categories of goods with distinct utility or distinct purposes in a single presentation to create grouping 110 with a particular style that is based on the two or more items having complementary or matching attributes in accordance with some embodiments presented herein. The style-driven system may generate UI 100 and/or grouping 110 to populate UI 100.

UI 100 may correspond to or may be part of a website, webpage, or other network accessible content. UI 100 may be defined with HyperText Markup Language ("HTML") code, scripting code, Cascading Style Sheets ("CSS"), and/or other code. UI 100 may be accessed in response to user directing a browser, application, or user equipment ("UE") to a Uniform Resource Locator ("URL") for the website, webpage, or other network accessible content of UI 100.

As shown in FIG. 1, grouping 110 may correspond to an outfit comprising a jacket, shirt, pants, shoes, and belt. Each of the items in grouping 110 is from a different category of goods. Each category of goods may have a different utility and/or purpose. For instance, the shirt has a different utility and purpose than the jacket, pants, shoes, and belt, and the jacket has a different utility and purpose than the shirt, pants, shoes, and belt. However, the items in grouping 110 fit a particular style, wherein the particular style may be defined by complementary or matching attributes of the items, and the complementary or matching attributes may specify a look, pattern, color, material, cut, fit, brand, and/or other visual characteristics that the items share or have in common with one another. In other words, the items in grouping 110 are not different variants of the same article of clothing or clothing accessories, but different articles of clothing and clothing accessories that have different uses and one or more complementary or matching attributes that bring about a common style. A complementary attribute may include an attribute with a value that is within a threshold value or range of a matching attribute value. For instance, a complementary color attribute for the color red may specify colors orange and yellow, but not the colors blue, green, black, white, and/or other colors. Similarly, a complementary pattern attribute for a checkered pattern may specify a striped pattern or polka dot pattern, but not a plain pattern, animal print pattern, and/or other patterns.

One or more rules may define acceptable styles for grouping 110. For instance, grouping 110 may not include more than one item from any particular category of goods (e.g., one clothing top, one clothing bottom, one pair of shoes, one belt, one hat, one pair of earrings, etc.). The rules may further define the style attributes that are acceptable for the style of grouping 110. For instance, the rules may specify an acceptable style having contrast coloring (e.g., white top and black bottom, bright-colored bottom, dark-colored top, brown or black shoes with dark pants, etc.). The one or more rules may also define coordinates for arranging items of grouping 110. For instance, hats and other headwear should be topmost and offset from a clothing top, the clothing top should be partially overlaid and obscure an uppermost portion of a clothing bottom, and clothing accessories should be aligned with an appropriate article of clothing or area of the human body.

UI 100 may provide grouping 110 as a part of a landing page that defaults to a presentation of grouping 110 prior to a user searching for or selecting a particular item. For instance, grouping 110 may include a most popular outfit or newest outfit that is promoted on the landing page. In some embodiments, grouping 110 may be part of a feed or a campaign for presenting items from different categories that conform to a common style, rather than presenting individual items (e.g., shirts) from a single category in isolation.

In some embodiments, the style-driven system may generate grouping 110 for a "hero" item of grouping 110. The hero item may be selected by a user and/or may be identified from a search query provided by the user. For instance, the user may search for a shirt with a polka dot pattern, and the style-driven system may generate grouping 110 in which the shirt is the hero item, and the other items in grouping 110 may be keyed off the style of the hero item.

In some embodiments, the style-driven system may automatically generate grouping 110 and/or other groupings that create different styles using different sets of items with attributes that are complementary or that match the style attributes of the hero item. In some embodiments, grouping 110 and/or other groupings may be manually generated by a stylist compiling the different sets of items for the different groupings of the hero item.

Figure 2:
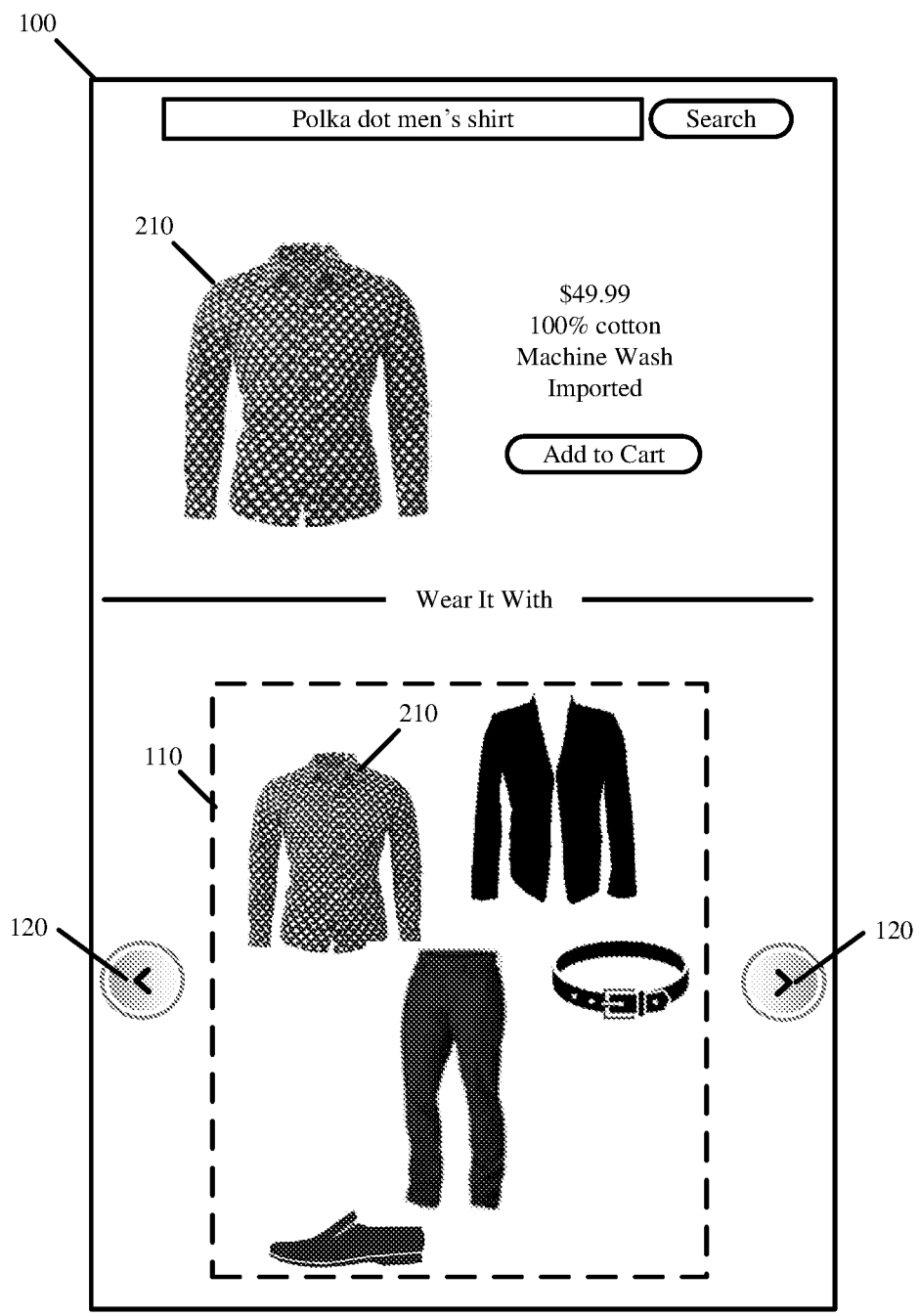
FIG. 2 illustrates an example of providing a grouping for a designated hero item in accordance with some embodiments presented herein.

FIG. 2 illustrates an example of providing grouping 110 for hero item 210 in accordance with some embodiments presented herein. As shown in FIG. 2, UI 100 may include a search bar for receiving a search query that identifies hero item 210. Alternatively, a user may select hero item 210 from a gallery or other listing of items, and the style-driven system may generate UI 100 to present hero item 210 in a first section, and grouping 110 in a second section, wherein grouping 110 may include an outfit that pairs hero item 210 with other items from other categories (e.g., pants, shoes, hats, and/or other articles of clothing or clothing accessories) that complement the style of hero item 210.

In any case, UI 100 may present grouping 110 so that the user can consider the different items of grouping 110 at one time and through a single presentation. In this manner, the user is able to visualize all items of a complete outfit rather than view each item in isolation, and, more importantly, can visualize the style that is created by all items of grouping 110 together.

UI 100 may include interactive controls 120 for toggling between different groupings. In response to activation of controls 120, UI 100 may replace grouping 110 with another grouping that provides a different outfit, wherein the different outfit may be generated to include hero item 210 from grouping 110 but with different complementary items that conform to a common style. In some embodiments, the different complementary items and/or the resulting groupings may create different or new styles that include hero item 210.

Figure 3:
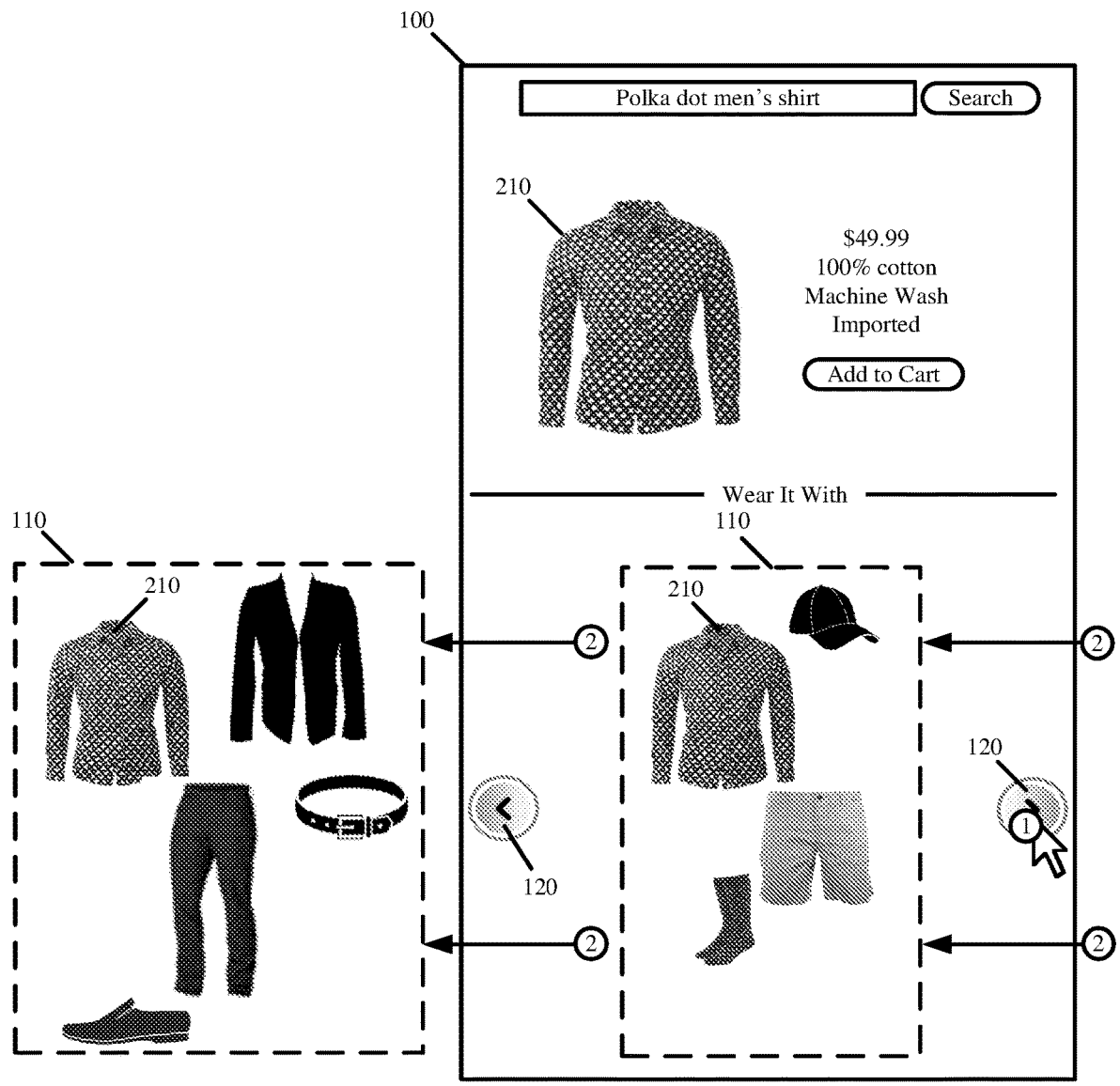
FIG. 3 illustrates an example of toggling between different groupings in the UI using one or more interactive controls in accordance with some embodiments presented herein.

FIG. 3 illustrates an example of toggling between different groupings in UI 100 using interactive controls 120 in accordance with some embodiments presented herein. FIG. 3 illustrates a user clicking (at 1) or otherwise selecting control 120, and the style-driven system updating (at 2) UI 100 to include new grouping 310 instead of grouping 110.

Grouping 310 may be keyed off and may include hero item 210. In some such embodiments, grouping 310 may include at least one item in common with grouping 110 (e.g., hero item 210), and at least one item that is different than the items of grouping 110. The style-driven system may generate grouping 310 with items that create a different style than the items of grouping 110. For instance, grouping 110 may include hero item 210 as part of a business-casual style, and grouping 310 may include hero item 210 as part of a casual style.

In some embodiments, UI 100 may include multiple groupings in a single presentation. The different groupings may be presented side-by-side or in a gallery format. Each grouping may correspond to a different container or module of UI 100. In some embodiments, the different groupings may be presented as a stacked carousel or other staggered presentation. In some embodiments, the different groupings may be presented in a pop-up window or a modal in response to a user interacting with hero item 210.

UI 100 may include interactive controls for customizing a grouping that is selected, frontmost, or otherwise displayed within UI 100. The interactive controls for customizing the grouping may include controls for replacing any individual item from a particular category of goods in the selected grouping with substitute items. The substitute items may be from the same particular category, and may have different visual characteristics that match the style of the individual item being replaced. In some embodiments, the substitute items may include items that are from a different category than the individual item being replaced, and that conform to the style of that individual item or the overall style of the grouping. For instance, an outfit may include a blouse, earrings, and skirt that create a particular style. The earrings may be selected for replacement, and UI 100 may present substitute items that include other earrings as well as sunglasses, purses, shoes, and/or other items in other categories that complement the particular style of the selected earrings or the outfit as a whole.

Figure 4:
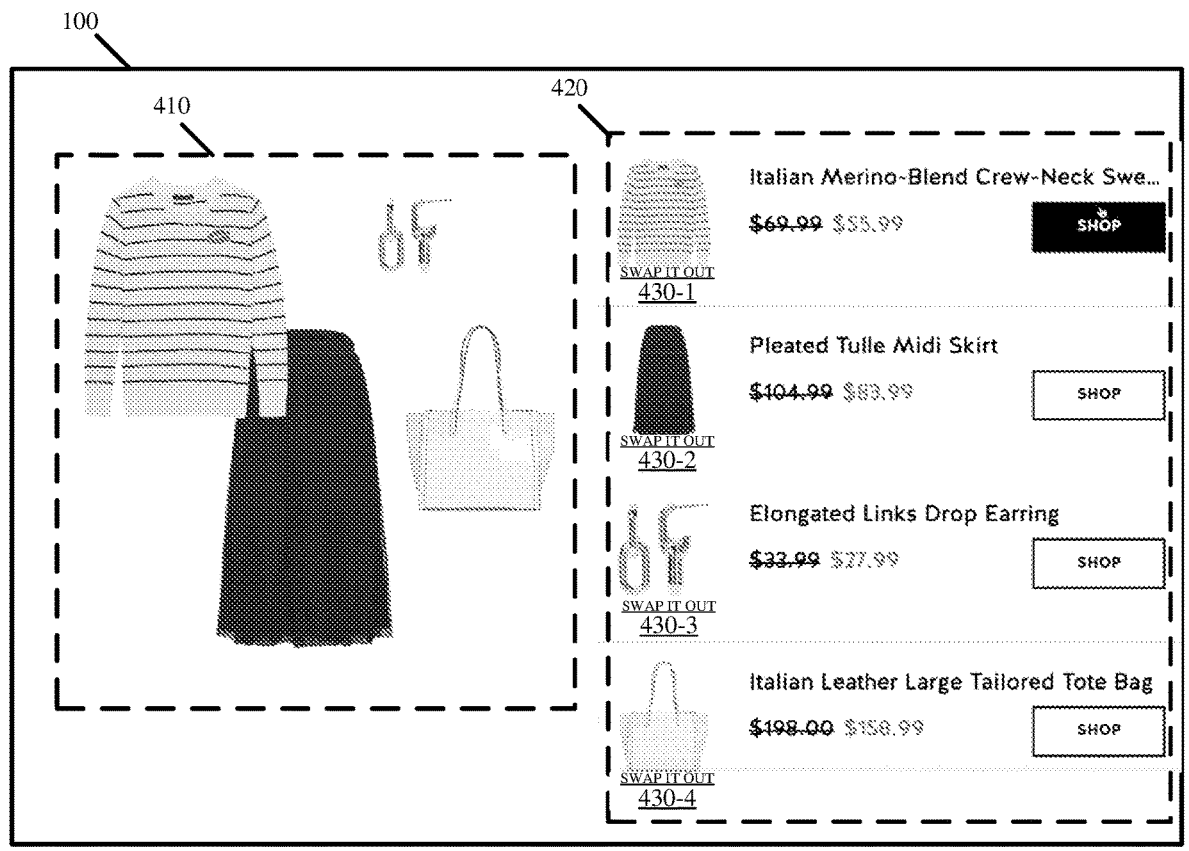
FIG. 4 illustrates an example of using mix-and-match controls of the UI in order to customize item items of a selected grouping in accordance with some embodiments presented herein.

FIG. 4 illustrates an example of using mix-and-match controls of UI 100 in order to customize items of a selected grouping in accordance with some embodiments presented herein. As shown in FIG. 4, UI 100 may present grouping 410, enumerated listing 420 for each item in grouping 410, and mix-and-match controls 430-1, 430-2, 430-3, and 430-4 (sometimes collectively referred to as "mix-and-match controls 430" or individually as "mix-and-match control 430") for each entry of enumerated listing 420.

In some embodiments, UI 100 may juxtaposition enumerated listing 420 and grouping 410. In some other embodiments, UI 100 may present enumerated listing 420 in response to user input. For instance, the user may hover over or select grouping 410 with a cursor or touch, and UI 100 may dynamically change to present enumerated listing 420 next to grouping 410 or in a modal, window, or other container that is presented in response to the user input.

Each mix-and-match control 430 may be activated in response to a user selection. The user may use a mouse, touchscreen, keyboard, or another input device to make the user selection.

Figure 5:
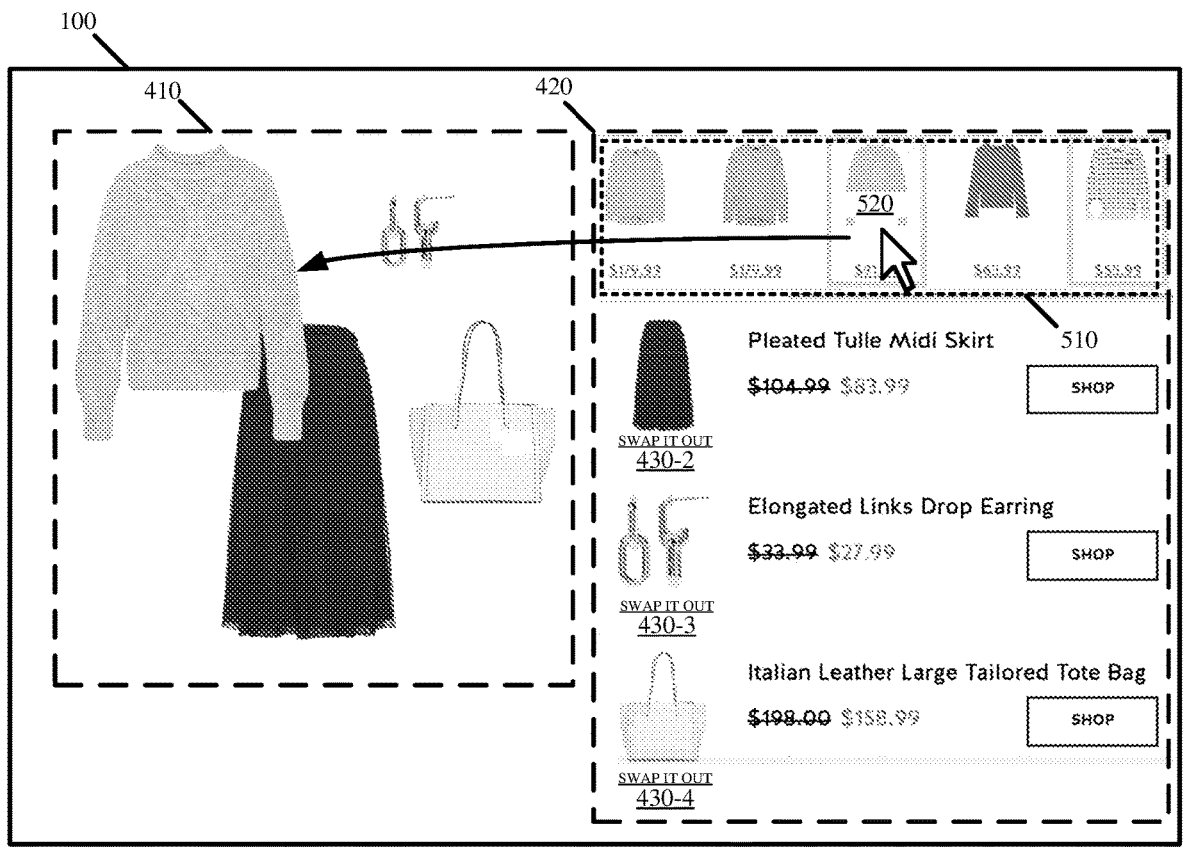
FIG. 5 illustrates an example of activating a mix-and-match control for a particular item in accordance with some embodiments presented herein.

FIG. 5 illustrates an example of activating mix-and-match control 430-1 for a particular item of grouping 410. In response to activation of mix-and-match control 430-1, UI 100 may present a set of substitute items 510 for the particular item. As shown in FIG. 5, the set of substitute items 510 may be presented over the entry of the particular item in enumerated listing 420.

The set of substitute items 510 may include items from the same category of goods as the particular item, that have the same utility and/or purpose as the particular item, and that match or fit the style of the particular item using different visual characteristics. For instance, the particular item may be a crew-neck sweater, and the set of substitute items 510 may include different crew-neck sweaters.

As noted above, the set of substitute items 510 may also include items from a different category than the category of the particular item and other items in grouping 410. For instance, the set of substitute items 510 may include a blouse that matches the style of the selected sweater and/or skirt, earrings, and purse of grouping 410. The set of substitute items 510 for the selected sweater would not, however, include another skirt, earrings, or purse since those items are already part of grouping 410, and presenting two of any one item violates the rules for a valid grouping, outfit, or style. The user may select the skirt from grouping 410 in order to visualize replacement skirts, pants, or other bottoms that preserve the style of the selected skirt or grouping 410.

A user may provide input to select substitute item 520 from the set of substitute items 510. In response to the selection, UI 100 dynamically updates grouping 410 by replacing the particular item with substitute item 520.

The modified presentation of grouping 410 allows the user to visualize substitute item 520 with the other items of grouping 410 at one time, and thereby customize grouping 410 according to user preferences. In this manner, the style-driven system and UI 100 may provide a holistic shopping experience with which the user can browse and purchase an outfit with a particular style. More specifically, the style-driven system and UI 100 may provide a holistic shopping experience with which the user can mix and match different articles of clothing and clothing accessories of an outfit from a unified presentation of the outfit items, rather than selecting each outfit item in isolation without being able to visualize the one or more items amongst other items of the outfit or being able to visualize how each outfit item fits the style of the other outfit items.

Rather than populate the set of substitute items 510 with any arbitrary set of items, the style-driven system may intelligently populate the set of substitute items 510 with items that match the style of the item that is selected for replacement and/or that match the style of the grouping. The style-driven system may account for various complementary or matching style attributes between the selected item for replacements and the items for the set of substitute items 510 when generating the set of substitute items 510.

UI 100 may be adapted to collectively present the common style that is created by different home goods, furnishings, furniture, and/or décor. The set of substitute items 510 may provide goods that are in the same category or different category as a good that is selected for replacement, and that have a complementary or matching style. For instance, the grouping may include different items furniture that match a farmhouse style. Accordingly, if a table from the grouping is selected for replacement, the style-driven system may dynamically provide other tables that match the farmhouse style.

Figure 6:
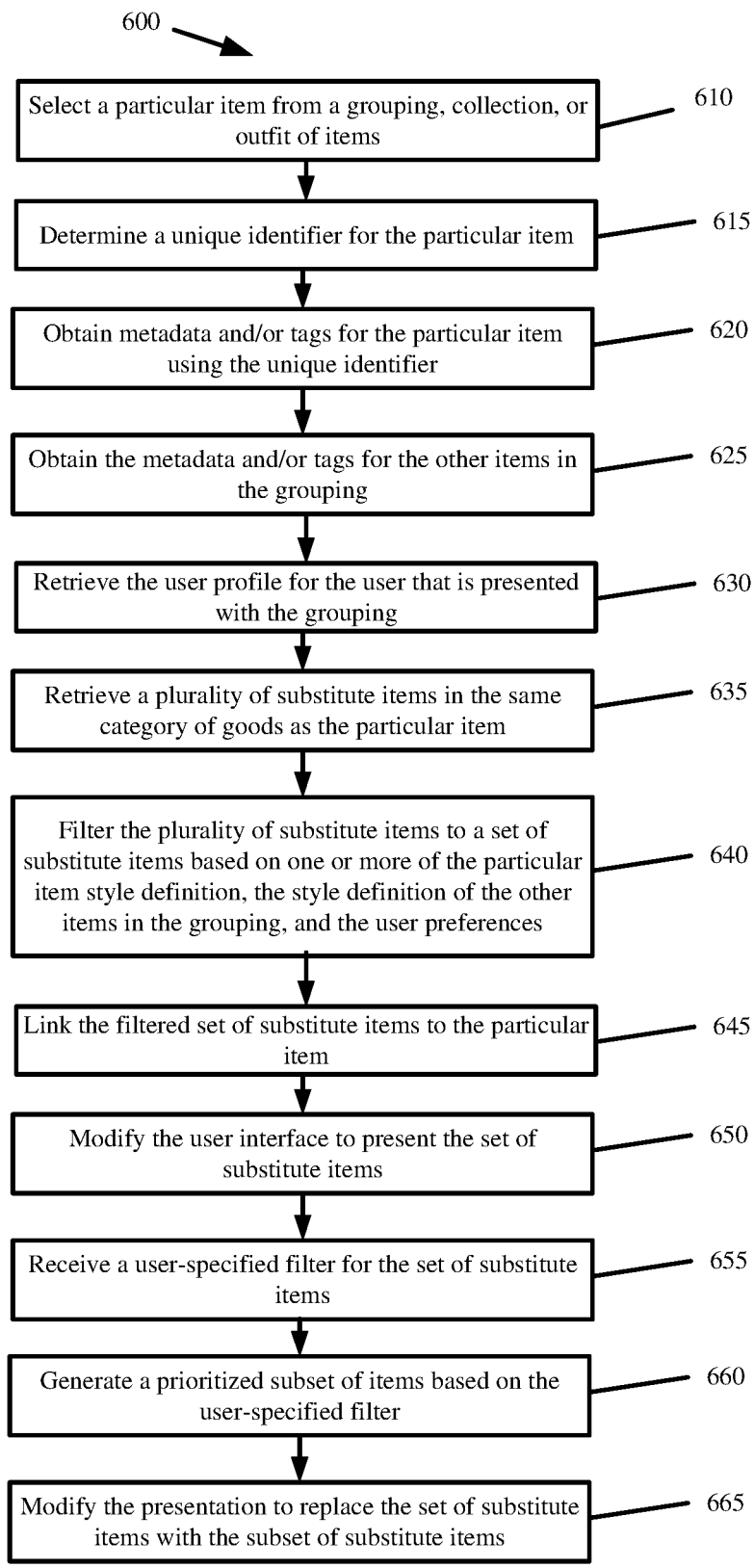
FIG. 6 presents a process for generating a set of substitute items that match the style of a particular item that is selected for replacement, and for implementing the mix-and-match functionality in accordance with some embodiments presented herein.

FIG. 6 presents a process 600 for generating a set of substitute items that match the style of a particular item that is selected for replacement, and for implementing the mix-and-match functionality in accordance with some embodiments presented herein. Process 600 may be performed by the style-driven system in response to inputs received via UI 100.

Process 600 may include selecting (at 610) a particular item from a grouping, collection, or outfit of items. In some embodiments, the style-driven system may generate a grouping of items, and may iteratively select (at 610) each item in the grouping in order to prepare the set of substitute items for each item in the grouping. In some other embodiments, the style-driven system may receive the selection (at 610) as a result of a user selection of the particular item when presenting the grouping and the interactive controls in UI 100.

Process 600 may include determining (at 615) a unique identifier for the particular item. Every item may be associated with a different unique identifier.

The unique identifier for the particular item may be used to retrieve additional data about the particular item. For instance, process 600 may include obtaining (at 620) metadata and/or tags for the particular item using the unique identifier. The metadata and/or tags may identify a particular category of goods that the particular item belongs to (e.g., shirts, blouses, dresses, pants, skirts, etc.), and may include one or more metadata style attributes and/or style tags for a style definition of the particular item defined according to one or more of a cut, design, make, model, brand, seasonal use, design date, material, print, pattern, shape, color, price, and/or other parameters.

In some embodiments, the set of substitute items for the particular item may be selected based on the metadata or tags of the particular item and other items in the grouping. In some such embodiments, the set of substitute items may be selected from the same particular category of goods as the particular item, but the set of substitute items may be selected to match the style of not just the particular item but all items in the grouping. For instance, if the particular item has a particular color, and the items in the grouping follow a color palette, the set of substitute items may be selected according to the color palette of grouping rather than just the particular color of the particular item or any arbitrary color. Accordingly, process 600 may include obtaining (at 625) the metadata and/or tags for the other items in the grouping. In particular, process 600 may determine the style definition for the entire grouping, as opposed to just the particular item, by obtaining (at 625) metadata style attributes and/or style tags for the style definition of the other items in the group.

In some embodiments, the set of substitute items may also be selected based on preferences recorded within a user profile for the user that selects the particular item for replacement. For example, if the particular item has a first color and the preferences within the user profile indicate that the user has a preference for a second color, then the set of substitute items may include variations of the particular item having the second color or similar coloring to the second color. As another example, if the particular item is a pant with a boot-cut, and the user preferences indicate past purchases of straight-cut pants, then the set of substitute items may prioritize pants with a straight-cut that may be in the same style as the particular item (e.g., low-rise, five-pocket design, etc.). Accordingly, process 600 may include retrieving (at 630) the user profile for the user that is presented with the grouping.

The style-driven system may intelligently curate the set of substitute items for the particular item based on one or more of the particular item style definition, the style definition of the other items in the grouping, and the user preferences. To do so, process 600 may include retrieving (at 635) a plurality of substitute items that are in the same category of goods as the particular item. The plurality of substitute items may include all items in the category of goods irrespective of whether the items fit the style of the particular item or the grouping. For instance, the particular item may be a slim-fit formal button-down solid color dress shirt, and the plurality of items may include casual dress shirts, short-sleeve button-down shirts, checkered-pattern dress shirts, striped dress shirts, etc. The style-driven system may access the item database to retrieve the plurality of substitute items in the same category of goods as the particular item that are currently in stock. In other words, the retrieval (at 635) may exclude items that are out-of-stock, of a different size, etc.

Process 600 may include filtering (at 640) the plurality of substitute items based on one or more of the particular item style definition, the style definition of the other items in the grouping, and the user preferences. The style-driven system may filter (at 640) the plurality of substitute of items to a set of substitute of items that are in the same category of goods as the particular item and that match or complement the style of the particular item, the grouping, and/or the user preferences by retaining items in the plurality of substitute items that have metadata style attributes and/or style tags that match or complement the metadata style attributes and/or style tags of the particular item, the grouping of items, or the user preferences from the user profile. Stated differently, the style-driven system may filter the plurality of items to exclude or remove items with different metadata style attributes and/or style tags than the metadata style attributes and/or style tags for the particular item, other items in the grouping, and/or user preferences.

For example, the particular item selected for replacement may be a sweater with a style definition of "patterned", "wool", "light color", "casual", and "fall collection 2020". The plurality of substitute items may include sweaters with different colors or patterns, hoodies, zip-up sweaters, and no-zip sweaters for different seasons and occasions. In this example, the style-driven system may filter the plurality of substitute items to produce a set of substitute items that have two or more of the "patterned", "wool", "cream-color", "casual", and "fall collection 2020" metadata style attributes and/or style tags. Additionally, or alternatively, the style-driven system may exclude items with any of the "dark color", "formal", "business", or "winter collection 2019" metadata style attributes and/or style tags. In some embodiments, the metadata style attributes and/or style tags can be values that are derived from a style taxonomy, and the values can describe one or more of the cut, design, make, model, brand, seasonal use, design date, material, print, pattern, shape, color, price, and/or other parameters that can be used to cross-link items from different categories of goods to a common style.

Process may include linking (at 645) the filtered set of substitute items to the particular item. In some embodiments, linking (at 645) the set of substitute items to the particular item may include presenting the set of substitute items in response to user interaction with the particular item in the grouping, an enumerated listing of items in the grouping, and/or other data that is displayed about the particular item in UI 100. In some embodiments, linking (at 645) the set of substitute items to the particular item may include creating a pointer from the particular item to the set of substitute items so that when a cursor hovers over, selects, or otherwise interacts with the particular item, UI 100 may modify (at 650) the presentation to display the set of substitute items. In some embodiments, modifying (at 650) the presentation may include generating a modal with the set of substitute items, or embedding the set of substitute items (e.g., in the enumerated list of items as illustrated in FIG. 5).

In some embodiments, a user may customize the set of substitute items by setting one or more filters for items to be included as part of the set of substitute items. For instance, mix-and-match controls 430 may be used to define a price filter so that all items included as part of a set of substitute items are priced less than a specified amount, belong to the same category of items as the item selected for replacement, and/or are of a similar style as the item selected for replacement. Mix-and-match controls 430 may be used to set color, pattern, size, brand, fit, material, and/or other filters for items to prioritize in the set of substitute items.

Accordingly, process 600 may include receiving (at 655) a user-specified filter for the set of substitute items. Process 600 may include generating (at 660) a prioritized subset of items based on the user-specified filter. Generating (at 660) the prioritized subset of substitute items may include prioritizing the items within the set of substitute of items by reordering, removing, and/or replacing items from the set of substitute items based on items that match the user-specified filter and items that do not match the user-specified filter. For instance, if the user-specified filter specifies a maximum price, the style-driven system may remove items from the set of substitute items that exceed the maximum price, may reorder the items according to price, and/or may replace one or more of the items that exceed the maximum price with other items that may have fewer matching metadata style attributes and/or style tags than the substitute items being replaced but that still fall within a common style defined for the subset of substitute items. Process 600 may include dynamically modifying (at 665) the presentation to include the subset of substitute items that adhere to the user-specified filter instead of the set of substitute items.

Figure 7:
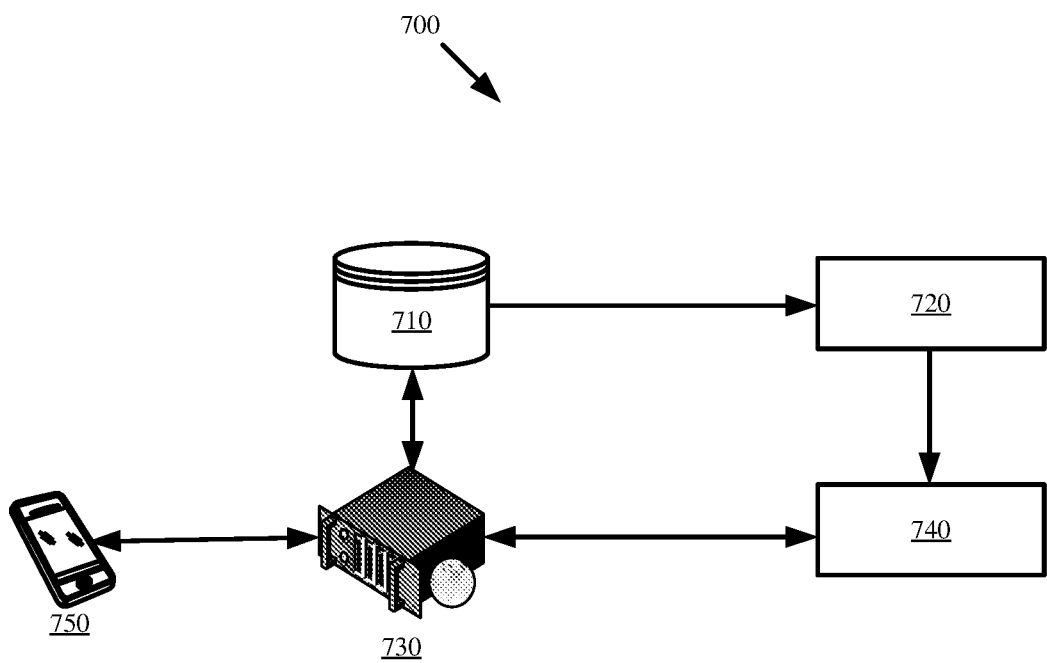
FIG. 7 illustrates an example architecture for the style-driven system in accordance with some embodiments presented herein.

FIG. 7 illustrates an example architecture 700 for the style-driven system in accordance with some embodiments presented herein. Architecture 700 may include item database 710, item ingesting and tagging module 720, front-end host 730, back-end controller 740, and UE 750. In some embodiments, the style-driven system includes one or more devices with processor, memory, storage, and network resources that create the holistic shopping experience and implement item database 710, item ingesting and tagging module 720, front-end host 730, and back-end controller 740. In some embodiments, the style-driven system may integrate with or operate as a service that enhances an online merchant or eCommerce site. In some such embodiments, functionality for one or more of item database 710 and front-end host 730 may execute from resources that are managed by the online merchant or eCommerce site, and ingesting and tagging module 720 and back-end controller 740, that are managed by the style-driven system may implement item, may remotely interface with and access item database 710 and/or front-end host 730 to create the holistic shopping experience described herein.

The quantity of modules, hosts, controllers, and/or devices, illustrated in FIG. 7, is provided for explanatory purposes only. In practice, architecture 700 may include additional modules, hosts, controllers, and/or devices; fewer modules, hosts, controllers, and/or devices; different modules, hosts, controllers, and/or devices; or differently arranged modules, hosts, controllers, and/or devices than illustrated in FIG. 7.

Item database 710 may correspond to a repository, storage, or data warehouse. Item database 710 may store the items from which the different groupings (e.g., outfits) for the holistic shopping experience can be generated. Item database 710 may store a data record for each item. The data record may include a name or identifier for the item, an item image, and data about the item such as pricing, categorization, size, color, current inventory count, etc.

Ingesting and tagging module 720 may periodically access item database 710 in order to obtain the item data records. For instance, ingesting and tagging module 720 may perform a daily ingest of the item data records in order to determine which items can be included that day in the groupings and/or as a substitute item. In some embodiments, the style-driven system may automatically update previously generated groupings and/or lists of substitute items based on a last ingest of items from item database 710 so as to ensure that only in stock items are presented in the groupings and/or sets of substitute items.

Ingesting and tagging module 720 may establish a network connection to item database 710, and may use Application Programming Interface ("API") calls to request the item data records from item database 710. Ingesting and tagging module 720 may inspect the data records and may generate metadata and/or tags for each item of a respective data record.

Figure 8:
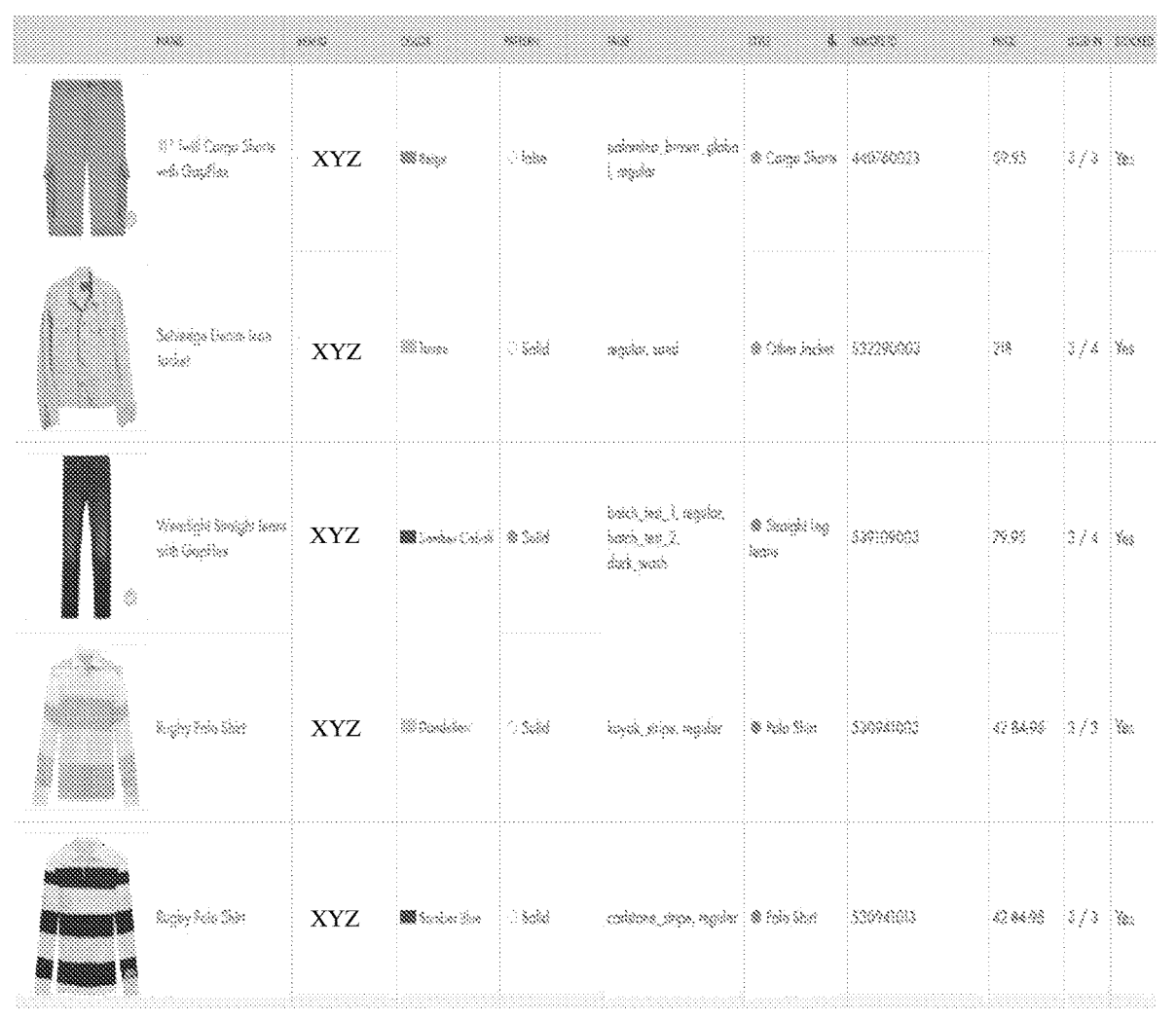

Generating the metadata may include mapping data from a data record to different metadata attributes or tags. In some embodiments, ingesting and tagging module 720 may map data from the item data records to values within a defined taxonomy. In some embodiments, ingesting and tagging module 720 may process or otherwise derive the metadata attributes or tags from the data record data. For instance, ingesting and tagging module 720 may process an item image from a data record and/or use image recognition routines to determine the item color, pattern, style, category, and/or other attributes. The generated metadata and/or tags may be linked back to the item, and may be stored in storage or memory of ingesting and tagging module 720 or may be entered back into item database 710. As noted above, the metadata and/or tags may include a unique identifier for referencing the item, one or more images of the item, and/or style definitions that may be based on one or more of the look, pattern, color, material, cut, fit, brand, and/or other visual characteristics of the item. FIG. 8 presents an example set of metadata and/or tags that may be generated by ingesting and tagging module 720 for different items in accordance with some embodiments presented herein.

Front-end host 730 may receive requests from UE 750 over a data network (e.g., the Internet), and may respond to the requests by providing different websites or content that include UI 100 and/or that provide the holistic shopping experience. Accordingly, front-end host 730 may be accessed from one or more web servers and/or a URL, domain name, or network address that is associated with front-end host 730.

In response to an initial request from UE 750, front-end host 730 may provide a landing page to UE 750. The landing page may include a search field for submitting a query for a desired item, or a default presentation of items from which the desired item may be selected. In some embodiments, the default presentation may include UI 100 with at least one grouping that includes two or more items from different categories of goods that produce an outfit or collection of items for a particular style. In response to a user query or user selection for the desired item, front-end host 730 may provide and/or update UI 100 with one or more groupings that include the desired item.

Front-end host 730 may receive the groupings, sets of substitute items, UI 100, outfits, and/or other generated data for the style-based presentation of the items from back-end controller 740. In some embodiments, front-end host 730 may interface with back-end controller 740 via a set of API calls, and may use the API calls to request one or more groupings for a particular item that is the subject of a user query or user selection. Back-end controller 740 may generate the one or more groupings as well as substitute items for items in the different groupings based on the metadata and/or tags provided by ingesting and tagging module 720, and may provide the groupings and substitute items to front-end host 730. In some embodiments, back-end controller 740 may generate website code that creates UI 100 with the groupings and substitute items. In some embodiments, back-end controller 740 may provide the groupings and substitute items in a JavaScript Object Notation ("JSON"), Extensible Markup Language ("XML"), or other data-interchange format, and front-end host 730 may produce the code for integrating the groupings and substitute items in a website that is rendered by UE 750. In some embodiments, back-end controller 740 may provide images for the items in a grouping, and may provide coordinates to produce a particular arrangement of the items that showcases the style that is created by the items. In other words, rather than arbitrary arrange the items or stagger them in an arbitrary order, back-end controller 740 may intelligently determine that hats and other headwear should be topmost and next to a clothing top, the clothing top should be partially overlaid and obscure an uppermost portion of a clothing bottom, and clothing accessories should be aligned with an appropriate article of clothing or area of the human body.

UE 750 may correspond to one or more network-enabled devices for requesting, accessing, and/or interfacing UI 100. UE 750 may include a portable computing and communication device, such as a personal digital assistant ("PDA"), a "smart" phone, a cellular phone, a laptop computer, a tablet computer, etc. UE 750 may also include a non-portable computing device, such as a desktop computer, a consumer or business appliance, a "smart" television, a set-top box, a gaming device, or another device that has the ability to connect to a wired or wireless network. UE 750 may, in some embodiments, include a computing and communication device that may be worn by a user (also referred to as "wearable" devices) such as a watch, a fitness band, a necklace, glasses, a ring, a belt, a headset, and/or another type of wearable device.

Figure 9:
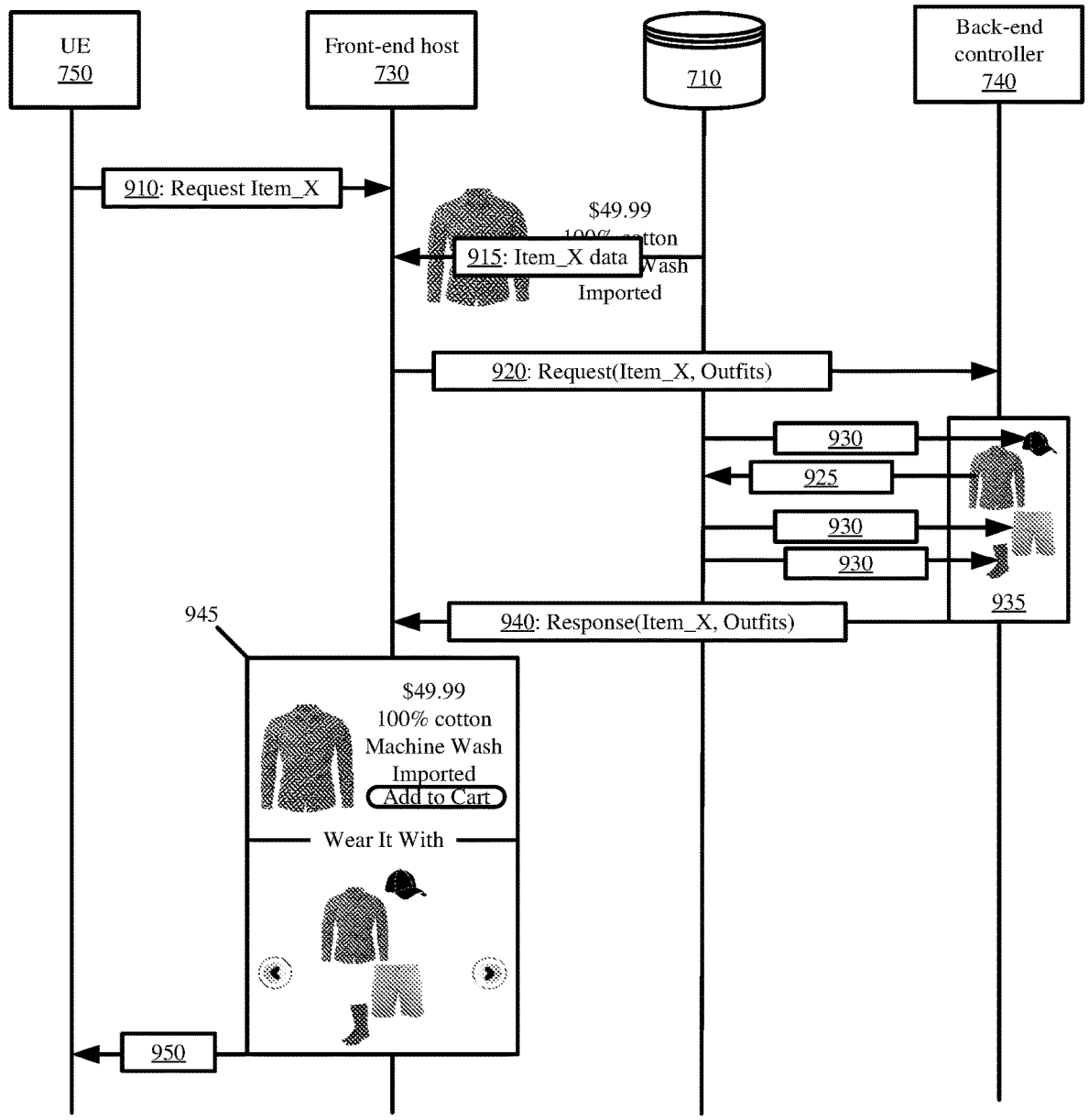
FIG. 9 presents an example message exchange diagram for generating the holistic shopping experience via a unified presentation so that the cohesive style of a collective of items can be visualized and customized using the UI in accordance with some embodiments presented herein.

FIG. 9 presents an example message exchange diagram for generating the holistic shopping experience via a unified presentation so that the cohesive style of a collective of items can be visualized and customized using UI 100 in accordance with some embodiments presented herein. The message exchange diagram may occur between a user, an online merchant and/or eCommerce site, and the style-driven system. As shown in FIG. 9, the message exchange diagram may occur between UE 750, front-end host 730, item database 710, and back-end controller 740.

UE 750 may issue (at 910) a request to front-end host 730. The request may include a URL that targets a website in which different items with different utilities and/or purposes from different categorizes of goods may be browsed. In particular, the request may target or select a particular item (e.g., "slim-fit female jeans").

Front-end host 730 may access (at 915) item database 710 to retrieve data about the particular item. The data may provide descriptive information about the particular item, and may include one or more images, pricing data, sizing data, inventory data, a textual description, and/or links to purchase the particular item.

Front-end host 730 may issue (at 920) an API call for one or more groupings that include the particular item to back-end controller 740 in parallel with accessing (at 915) item database 710 or in response to the particular item data that is retrieved from item database 710. The API call may include a unique identifier for the particular item and/or the one or more groupings that include the particular item. For instance, the identifier may include an encoded first value that identifies the particular item, and an encoded second value that identifies a desired collection or styling for the particular item (e.g., summer collection, casual collection, etc.).

Back-end controller 740 may generate a response based on the API call. The response may include one or more groupings that include the particular item and other items that match a collective style, wherein the collective style may be generated based on the second value in the identifier of the API call. In some embodiments, back-end controller 740 may have previously generated the groupings, and may select the one or more groupings that match the desired collection or styling specified in the API call. In some embodiments, back-end controller 740 may dynamically generate the one or more groupings based on real-time inventory and a recent ingest of items from item database 710.

Generating the response may include querying (at 925) for items stored in or ingested from item database 710 with metadata style attributes and/or style tags that match the desired style for the particular item, selecting (at 930) the particular item and at least one other item from a different category of goods than the particular item with the matching metadata style attributes and/or style tags for the desired style, and arranging (at 935) the items of the grouping so that the style created by the two or more items can be visualized together in a single presentation. The arrangement may include placing the items with a horizontal and vertical offset that coincides with the placement of the items on the human body, and providing overlap so that the matching or complementary styles of the items are adjacent or intersecting at one or more points without obscuring the items. For instance, the arrangement may include images for all items in the grouping with a particular alignment of the images that is based on the utility of each item (e.g., hat above a shirt, the shirt about pants, the pants above shoes, etc.).

The response may further include data for each item in the one or more groupings, and data for substitute items for each item in the one or more groupings. The data may include descriptive information that may be presented with the items. The data may further include pricing, available sizes, and/or other information. The response may further include the interactive controls by which the user may toggle between the different groupings and/or select different items from the groupings to be replaced or to be added into a shopping for subsequent purchase.

Back-end controller 740 may provide (at 940) the response to the front-end host 730. The response may be provided as a JSON file, HTML code, JavaScript code, XML file, and/or other data formats.

Front-end host 730 may incorporate (at 945) the response with the particular item data that is retrieved (at 920) from the item database 710. For instance, front-end host 730 may generate a UI as a unified page or content that presents information about the particular item in a first section, and the one or more groupings from back-end controller 740 in a second section.

Front-end host 730 may provide (at 950) the UI and/or the unified page or content to UE 750. UE 750 may render the unified page or content to present the information about the particular item and to provide the interactive controls by which the user may interact with the one or more groupings as described above.

Figure 10:
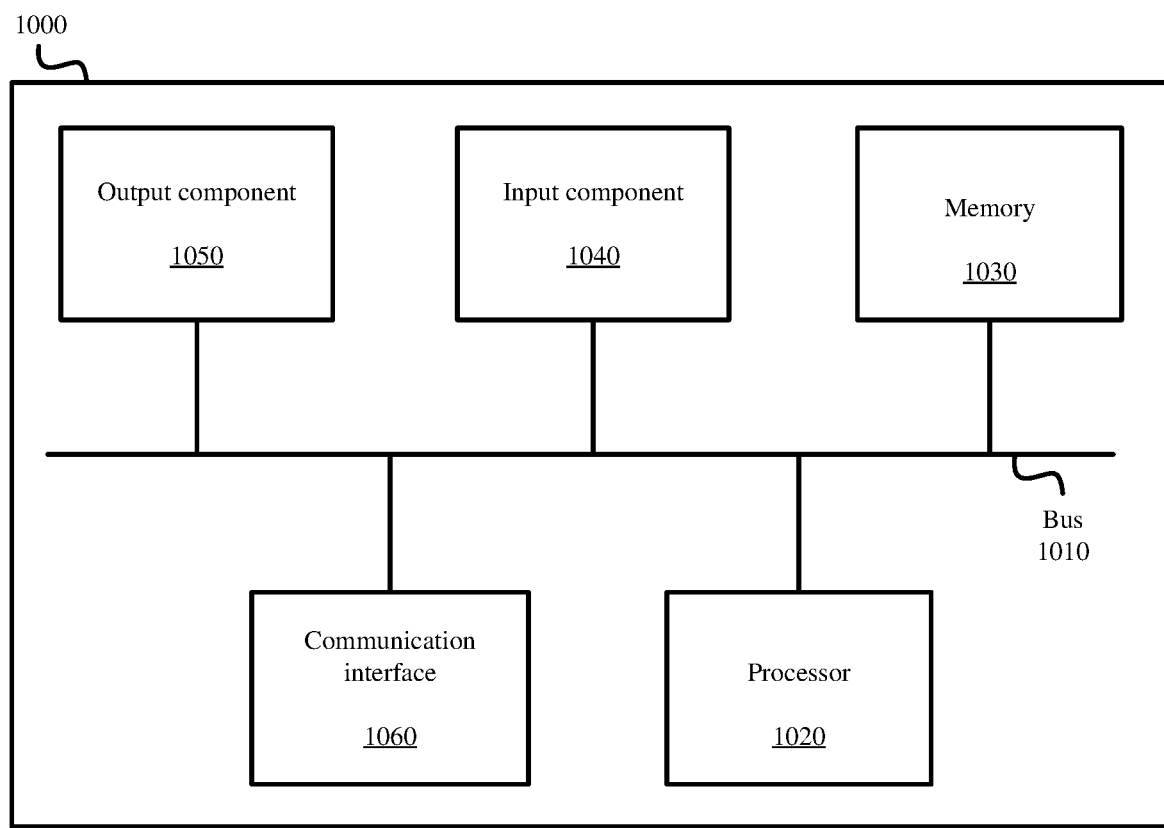
FIG. 10 illustrates example components of one or more devices, according to one or more embodiments described herein.

FIG. 10 is a diagram of example components of device 1000. Device 1000 may be used to implement one or more of the devices or systems described above (e.g., the style-driven system, item database 710, ingesting and tagging module 720, front-end host 730, back-end controller 740, UE 750, etc.). Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A computer-implemented method of generating an interactive user interface ("UP") within a network accessible site for mixing-and-matching individual items within a collective styling comprising multiple items, wherein the computer-implemented method comprises:
   presenting, by execution of a site customization system, a first visualization of the interactive UI comprising a first set of UI elements arranged in a first grouping wherein the first set of UI elements represents two or more items from a plurality of categories that have one or more complementary or matching attributes;
   generating, by execution of the site customization system, code for a second visualization that is presented in combination with the first visualization based on each UI element of the first set of UI elements, wherein generating the code comprises defining a window adjacent to the first visualization with a plurality of UI entries arranged in different rows, each UI entry of the plurality of UI entries presenting information about a different item of the two or more items and a mix-and-match control that replaces the information with images of two or more substitute items for the different item;
   dynamically changing, by execution of the site customization system, the second visualization in response to a user input that activates the mix-and-match control of a particular UI entry from the plurality of UI entries, wherein dynamically changing the second visualization comprises:
      replacing the information about a particular item represented in the particular UI entry of the second visualization with interactive UI elements representing a plurality of substitute items from categories that differ from categories of items presented in other UI entries of the plurality of UI entries while presenting the information about other items of the two or more items in other rows corresponding to the other UI entries of the plurality of UI entries; and
   modifying, by execution of the site customization system, the first visualization to present a second set of UI elements arranged in a second grouping, wherein the second set of UI elements represents the two or more items with the particular item from the first grouping replaced by a substitute item from the plurality of substitute items in response to a selection of an interactive UI element that represents the substitute item from the particular UI entry of the second visualization.

2. The computer-implemented method of claim 1, wherein dynamically changing the second visualization further comprises:
   changing the particular UI entry from presenting the interactive UI elements representing the plurality of substitute items to presenting information about the substitute item after the selection of the interactive UI element that represents the substitute item.

3. The computer-implemented method of claim 1,
   wherein each substitute item from the plurality of substitute items is from a same category as the particular item, and
   wherein the particular item is from a different category than the other items of the two or more items.

4. The computer-implemented method of claim 1,
   wherein the plurality of substitute items includes one or more items from a category that is different than the plurality of categories.

5. The computer-implemented method of claim 1,
   wherein the plurality of substitute items includes two or more items with attributes that complement or match attributes of the first grouping.

6. The computer-implemented method of claim 1,
   wherein the plurality of substitute items includes two or more items with attributes that complement or match attributes of the particular item.

7. The computer-implemented method of claim 1, wherein dynamically changing the second visualization further comprises:
   selecting the plurality of substitute items to include:
      items from a category that is related to a category of the particular item and that does not match a category of another item from the two or more items, and
      items with attributes that complement or match attributes of one or more of the two or more items.

8. The computer-implemented method of claim 1,
   wherein the two or more items comprise different clothing articles and clothing accessories from the plurality of categories, and
   wherein the plurality of categories comprise two or more of hats, clothing tops, clothing bottoms, outerwear, underwear, socks, shoes, belts, purses, earrings, and necklaces.

9. The computer-implemented method of claim 1, wherein dynamically changing the second visualization further comprises:
   selecting each item of the plurality of substitute items to have one or more of a cut, a design, a brand, a seasonal use, a design date, a material, a print, a pattern, a shape, and a color in common with the particular item.

10. The computer-implemented method of claim 1,
    wherein the first visualization further comprises one or more interactive controls that switch between the first grouping and a third grouping, and
    wherein the third grouping comprises one item from the first grouping that is styled with one or more items that differ from items of the first grouping.

11. A style-driven system for generating an interactive user interface ("UP") within a network accessible site for mixing-and-matching individual items within a collective styling comprising multiple items, the style-driven system comprising:
one or more hardware processors configured to:
present a first visualization of the interactive UI comprising a first set of UI elements arranged in a first grouping, wherein the first set of UI elements represents two or more items from a plurality of categories that have one or more complementary or matching attributes;
generate code for a second visualization that is presented in combination with the first visualization based on each UI element of the first set of UI elements, wherein generating the code comprises defining a window adjacent to the first visualization with a plurality of UI entries arranged in different rows, each UI entry of the plurality of UI entries presenting information about a different item of the two or more items and a mix-and-match control that replaces the information with images of two or more substitute items for the different item; and
dynamically change the second visualization in response to a user input that activates the mix-and-match control of a particular UI entry from the plurality of UI entries, wherein dynamically changing the second visualization comprises:
replacing the information about a particular item represented in the particular UI entry of the second visualization with interactive UI elements representing a plurality of substitute items from categories that differ from categories of items presented in other UI entries of the plurality of UI entries while presenting the information about other items of the two or more items in other rows corresponding to the other UI entries of the plurality of UI entries; and
modify the first visualization to present a second set of UI elements arranged in a second grouping, wherein the second set of UI elements represents the two or more items with the particular item from the first grouping replaced by a substitute item from the plurality of substitute items in response to a selection of an interactive UI element that represents the substitute item from the particular entry of the second visualization.

12. The style-driven system of claim 11, wherein dynamically changing the second visualization further comprises:
changing the particular UI entry of the second visualization from presenting the plurality of substitute items to presenting information about the substitute item after the selection of the substitute item.

13. The style-driven system of claim 11,
wherein each substitute item from the plurality of substitute items is from a same category as the particular item, and
wherein the particular item is from a different category than the other items of the two or more items.

14. The style-driven system of claim 11,
wherein the plurality of substitute items includes one or more items from a category that is different than the plurality of categories.

15. The style-driven system of claim 11,
wherein the plurality of substitute items includes two or more items with attributes that complement or match attributes of the first grouping.

16. The style-driven system of claim 11, wherein dynamically changing the second visualization further comprises:
selecting the plurality of substitute items to include:
items from a category that is related to a category of the particular item and that does not match a category of another item from the two or more items, and
items with attributes that complement or match attributes of one or more of the two or more items.

17. The style-driven system of claim 11, wherein dynamically changing the second visualization further comprises:
selecting each item of the plurality of substitute items to have one or more of a cut, a design, a brand, a seasonal use, a design date, a material, a print, a pattern, a shape, and a color in common with the particular item.

* * * * *